UNITED STATES PATENT OFFICE.

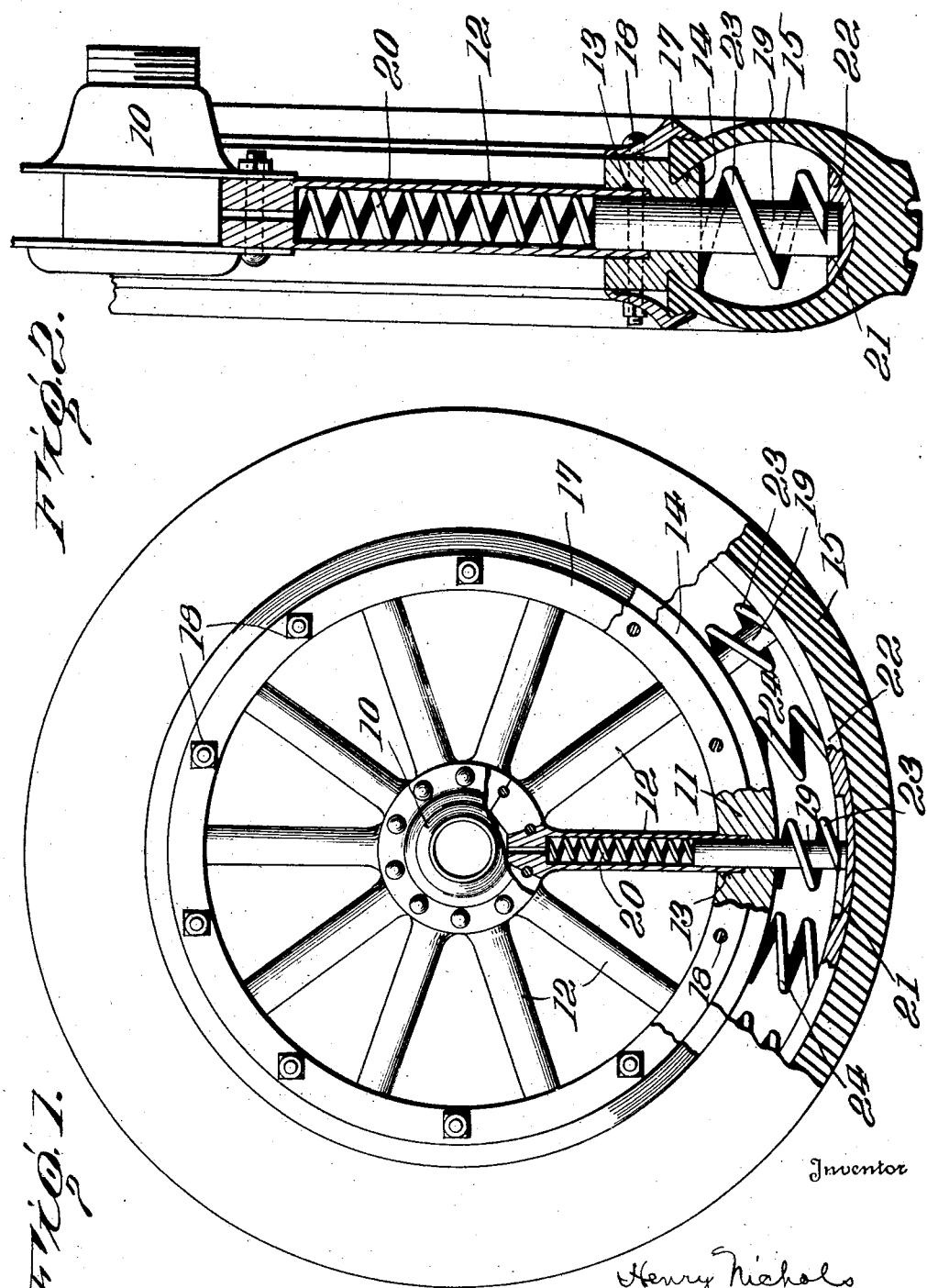

HENRY NICHOLS, OF NEW YORK, N. Y.

WHEEL.

1,404,047. Specification of Letters Patent. Patented Jan. 17, 1922.

Application filed October 3, 1919. Serial No. 328,217.

*To all whom it may concern:*

Be it known that I, HENRY NICHOLS, a citizen of the United States, residing at New York, in the county of New York and State of New York, have invented a new and useful Wheel, of which the following is a specification.

This invention is a resilient wheel for use on motor and other vehicles.

One of the objects of the invention is to provide means whereby a rubber shoe of the type commonly employed with pneumatic tires, may be utilized as the tread member of a resilient wheel. A further object is to provide a rim and felly structure by means of which the rubber shoe may be conveniently secured in place.

The invention will be hereinafter fully set forth and particularly pointed out in the claim.

In the accompanying drawing:—

Figure 1 is a side elevation of a wheel, partly in section, illustrating the invention.

Figure 2 is a transverse sectional view.

Referring to the drawing, 10 designates the hub, 11 the felly, and 12 a series of hollow spokes connecting the hub and felly, the outer ends of the spokes extending into openings 13 formed in the felly, the inner ends being connected to the hub in any desired or well known manner. The sides of the felly are provided with grooves 14, shaped to receive the inner edges of a rubber shoe 15, of the type commonly employed in connection with pneumatic tires. The outer edges of the shoe are engaged by clamping rings 17, retained in position by bolts 18 passed through the felly, said rings serving to securely clamp the shoe 15 in place.

Working in the openings 13 and the hollow spokes 12, are plungers 19, normally pressed away from the hub by means of springs 20, located within the spokes and bearing against the inner ends of the plungers. The outer ends of the plungers 19 extend into recesses 21, formed in the inner face of an abutment ring 22, bearing against the inner circumferential wall of the shoe 15, and conforming to the contour thereof. The recesses 21 are elongated to permit of a slight circumferential movement of the outer ends of the plungers. Each plunger 19 is encircled by a helical spring 23, the ends of which bear against the outer circumference of the felly and the inner surface of the abutment ring 22, said springs acting to hold the shoe in a normally distended condition. Additional springs 24, interposed between the felly and the abutment ring, are also provided.

In practice, the shoe 15 is applied by first fitting it around the abutment ring 22, so as to enclose the springs 23 and 24, and the protruding portions of the plungers 19. The beads of the shoe are then brought into engagement with the grooves 14 in the side of the felly, and firmly secured in position by drawing up the clamping rings 17. In operation, the springs 23 and 24 are sufficiently heavy to sustain the weight of the load and to keep the shoe 15 normally distended in much the same manner as a pneumatic tube would, the necessary resilience being supplied by said springs and the springs 20. In this manner all of the advantages of the pneumatic tube are obtained without the risk of damage by puncture and blow-outs.

Having thus explained the nature of the invention and described an operative manner of constructing and using the same, although without attempting to set forth all ways in which it may be made, or all of the manners of its use, what is claimed is:—

A wheel of the character described comprising a hub, a felly, tubular spokes rigidly connecting the hub and the felly, a standard tire shoe having its beads secured to said felly, plungers working in said spokes, springs within the spokes forcing the plungers normally outward against the inner surface of the tread portion of the shoe to maintain said shoe in a distended condition, and supplemental springs encircling said plungers and interposed between the felly and the shoe, said supplemental springs being heavier than the springs within the spokes, whereby they take up the greater portion of the road shocks.

In testimony whereof I have hereunto set my hand.

HENRY NICHOLS.